(12) United States Patent
Ren et al.

(10) Patent No.: US 8,570,890 B2
(45) Date of Patent: Oct. 29, 2013

(54) MOBILE RADIO COMMUNICATIONS DEVICE AND RELATED METHOD OF OPERATION

(75) Inventors: Weili Ren, Berkshire (GB); Michael Nosley, Berkshire (GB)

(73) Assignee: NEC Corporation, Tokyo (JP)

( * ) Notice: Subject to any disclaimer, the term of this patent is extended or adjusted under 35 U.S.C. 154(b) by 315 days.

(21) Appl. No.: 13/000,851

(22) PCT Filed: Jun. 18, 2009

(86) PCT No.: PCT/JP2009/061549
§ 371 (c)(1),
(2), (4) Date: Jan. 26, 2011

(87) PCT Pub. No.: WO2010/001789
PCT Pub. Date: Jan. 7, 2010

(65) Prior Publication Data
US 2011/0116407 A1    May 19, 2011

(30) Foreign Application Priority Data

Jul. 2, 2008 (GB) .................................. 0812089.1

(51) Int. Cl.
*H04J 1/16* (2006.01)
*H04J 3/16* (2006.01)
(52) U.S. Cl.
USPC ........................... 370/252; 370/337; 370/516
(58) Field of Classification Search
USPC ................................. 370/252, 337, 516, 347
See application file for complete search history.

(56) References Cited

U.S. PATENT DOCUMENTS

| 8,274,995 B2 | 9/2012 | Guey et al. |
| 2001/0031022 A1 | 10/2001 | Petrus et al. |
| 2004/0235506 A1 | 11/2004 | Roettger et al. |
| 2006/0166688 A1* | 7/2006 | Sun et al. ....................... 455/502 |
| 2006/0171328 A1* | 8/2006 | Ohtani et al. ................. 370/252 |
| 2007/0010253 A1* | 1/2007 | Gunnarsson et al. ......... 455/442 |
| 2007/0021122 A1 | 1/2007 | Lane et al. |
| 2007/0293157 A1 | 12/2007 | Haartsen et al. |
| 2008/0291878 A1* | 11/2008 | Zhang et al. .................. 370/336 |
| 2009/0141701 A1* | 6/2009 | Dalsgaard ..................... 370/350 |
| 2009/0186613 A1* | 7/2009 | Ahn et al. ..................... 455/434 |
| 2009/0247087 A1* | 10/2009 | Chin et al. ................. 455/67.14 |
| 2009/0316811 A1* | 12/2009 | Maeda et al. ................. 375/260 |

(Continued)

FOREIGN PATENT DOCUMENTS

| CN | 1326623 A | 12/2001 |
| CN | 1607787 A | 4/2005 |

(Continued)

OTHER PUBLICATIONS

IEEE Standard for Local and metropolitan area networks, Part 16: Air Interface for Fixed Broadband Wireless Access Systems, IEEE 802.16e, 2005.

(Continued)

*Primary Examiner* — Andrew Lee

(57) ABSTRACT

A mobile station establishes UL synchronization by the use of downlink preamble messages, and by monitoring timing drift within the downlink signalling and by updating the UL synchronization value responsive to the magnitude of the timing drift exceeding a threshold value. Tx power values can also be updated as a function of the updated synchronization value.

19 Claims, 3 Drawing Sheets

(56) References Cited

U.S. PATENT DOCUMENTS

2010/0098051 A1* 4/2010 Uemura .................. 370/350
2011/0116407 A1* 5/2011 Ren et al. ................ 370/252
2011/0176535 A1* 7/2011 Lipka et al. ............. 370/350

FOREIGN PATENT DOCUMENTS

| CN | 1859675 A | 11/2006 |
|---|---|---|
| EP | 1 130 793 A1 | 9/2001 |
| GB | 2357401 A | 6/2001 |
| GB | 2413036 A | 10/2005 |
| WO | 2007015828 A2 | 2/2007 |
| WO | 2007088633 A1 | 8/2007 |
| WO | 2008136488 A | 11/2008 |

OTHER PUBLICATIONS

Japanese Office Action for JP2010-550970 mailed on Oct. 10, 2012.
International Search Report for PCT/JP2009/061549 mailed Oct. 13, 2009.
IEEE Standard for Local and metropolitan area networks, Part 16: Air Interface for Fixed Broadband Wireless Access Systems, IEEE Std 802.16. XP-002544590, 2004, pp. 1-16, 152-177, 343-345, 477-480, 620-622, 637-640.
WiMAX Forum, Mobile System Profile Release 1.0 Approved Specification, Revision 1.4.0, May 2, 2007.
Chinese Office Action for CN 2009801242645 dated on Feb. 28, 2013 with Partial English Translation.
Taiwanese Office Action for TW098121066 dated on Feb. 8, 2013.

* cited by examiner

MOBILE RADIO COMMUNICATIONS DEVICE AND RELATED METHOD OF OPERATION

This application is the National Phase of PCT/JP2009/061549, filed Jun. 18, 2009, which is based upon and claims the benefit of priority from UK patent application No. 0812089.1, filed on Jul. 2, 2008, the disclosure of which is incorporated herein in its entirety by reference.

TECHNICAL FIELD

The present invention relates to a mobile radio communications device such as any form of User Equipment (UE) of a mobile radio communications network, and to a method of operation of the same and in particular which seeks to improve operational characteristics thereof.

BACKGROUND ART

For mobile radio communications devices such as UE handsets operating within a mobile radio communications network, it can prove important to control various operational characteristics in an attempt to optimise performance of the handset within the network. For example, synchronisation of the UE with a network Base Station (BS) and/or the control of transmission power within the UE comprise important characteristics determining the overall efficiency of operation of the UE.

Techniques are currently known for attempting to maintain the required synchronisation and/or appropriate transmission power levels for the UE and commonly involve a signalling exchange between the UE and the BS. However, this has a disadvantageous effect on power requirements and on the signalling load within the network. In particular, the power requirements of the UE increased and limitations on the possible deployment of power-saving features such as "sleep mode" can lead to further operational inefficiencies.

DISCLOSURE OF INVENTION

The present invention seeks to provide for a mobile radio communications device, and related method of operation, having advantages over known such devices and methods.

According to one aspect of the present invention there is provided a method of controlling UL synchronisation in a mobile station of a radio communications network, and including the steps of monitoring timing drift within downlink signalling and updating the uplink synchronisation value responsive to the said timing drift exceeding a threshold value.

The required synchronisation can therefore advantageously be maintained without requiring UL signalling. The aforementioned threshold value can be transmitted by way of Downlink Channel Descriptor (DCD) message signalling.

Further the said threshold value can be determined at a' base station within the radio communications network and responsive to at least cell size, cyclic prefix length and measurement accuracy.

In particular, the update uplink synchronisation value can be determined on the basis of the sum of the current synchronisation value and twice the magnitude of the said timing drift in the DL signalling.

According to another aspect of the invention there is provided a method of determining an update value for UL synchronisation in a mobile radio communications network and having regard to a current synchronisation value, including the step of determining timing drift within downlink signalling, and wherein the update synchronisation value comprises the sum of the said current synchronisation value and twice the magnitude of the said timing drift.

Advantageously, the timing drift is determined on the basis of DL preamble measurements.

It will be appreciated that the method outlined above can be provided within a WiMAX system. Further, the method can prove particularly applicable for a communication system operating in Time Division Duplex mode.

Turning now to another aspect of the invention, there is provided a method controlling a Tx power value in a mobile station in a radio communications network, including the step of determining uplink synchronisation as outlined above and wherein the updated Tx power value comprises the sum of a previous power value and a function of the said synchronisation.

It should be appreciated that the method of Tx power control can include the method of controlling UL synchronisation outlined above and such that the Tx update value arises whenever the uplink synchronisation value is updated.

Yet further, the present invention can provide for a mobile radio communications device for use within a mobile radio communications network and arranged for controlling uplink synchronisation values, and including means for monitoring a downlink timing drift value and means for updating the uplink synchronisation value responsive to the magnitude of the downlink timing drift value exceeding a threshold value.

The device preferably includes means for determining the updated uplink synchronisation value on the basis of the sum of the previous value and twice the said magnitude of the downlink timing drift.

Still further, the invention can provide for a mobile radio communications device for the use in a mobile radio communications network and arranged for determining an update value for uplink synchronisation and including means for determining the magnitude of downlink timing drift and wherein the update synchronisation value is determined on the basis of the sum of the previous uplink synchronisation value and twice the magnitude of the said timing drift.

The aforesaid device can include means for determining an updated Tx power value as a function of the updated uplink synchronisation value.

Also, the device can be arranged for updating the Tx power value when the uplink synchronisation value updates.

Of course the device can be arranged such that the timing drift is determined on the basis of downlink preamble measurements.

As will be appreciated, the invention provides for autonomous maintenance within an MS of the UL Timing_Offset value and which therefore advantageously removes the need for periodic ranging procedures and so can reduce signalling overhead and radio resource usage.

BRIEF DESCRIPTION OF THE DRAWINGS

The invention is described further hereinafter, by way of example only, with reference to the accompanying drawings in which.

BEST MODE FOR CARRYING OUT THE INVENTION

Figure 1:
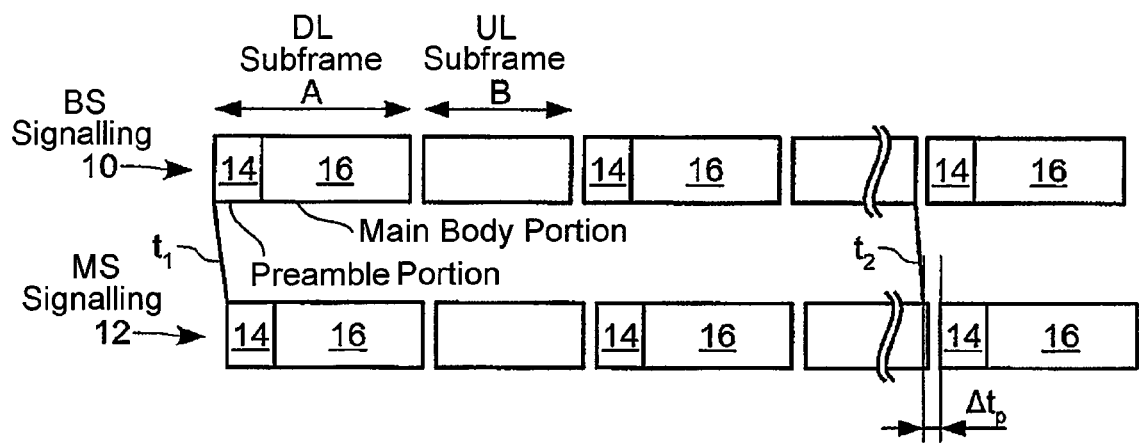
FIG. 1 is a timing diagram for downlink preamble transmissions arising in signalling between a network base station and mobile station.

The following discussion of an embodiment of the present invention is based upon IEEE standards (IEEE 802.16-2004 and IEEE 802.16e2005) relating to WiMAX systems requiring in particular that a UE such as a Mobile Station (MS) that remains connected with a network BS should maintain Up Link (UL) synchronisation and also update UL transmission power so as to compensate appropriately for its mobility within the network.

As will be appreciated from the known standards, initially the UL synchronisation, also referred to as "Time_Offset", and the MS transmission power, commonly identified as Tx power, are acquired by the MS and delivered from the BS by way of Initial Ranging signalling during network entry and initialisation.

On the basis of the arrival of a Ranging signal from the MS, the BS can measure the round-trip propagation delay of the signal which is then known to be equivalent to the Timing_Offset that the MS needs to apply for appropriate UL transmission. Also, based upon the signal strength of the received Ranging signal, the BS can calculate the required Tx power adjustment that should be applied in the MS for appropriate UL transmissions.

Once so determined, the BS can send such values for the Timing_Offset and Tx power to the MS in its Ranging Response signalling.

It is also noted that the Ranging signal may experience multi-path fading in the UL channel such that its arrival time at the BS may suffer delay spread and its received signal strength at the BS may fluctuate.

Further, it is known that in Orthogonal Frequency Division Multiple Access (OFDMA) a Cyclic Prefix (CP) is added to each OFDM symbol to collect a fading delay spread, and in order to prevent inter-symbol interference. An additional link budget margin is also reserved to accommodate received signal strength fluctuation caused by such fading. As noted later, and due in particular to fading delay spread, the required Timing_Offset accuracy within OFDMA systems can be defined as one-quarter, or at least one-half, of the CP (Cyclic Prefix) duration.

After the Initial Ranging signalling, appropriate Timing_Offset and Tx power levels are maintained via Periodic Ranging until the MS disconnects from the BS. In addition to such Periodic Ranging, the normal UL data transmissions can also be employed to update Timing_Offset and Tx power adjustments, if such transmissions occur prior to the next scheduled Periodic Ranging signal.

The ongoing adjustment of the Timing_Offset and the Tx power are generally required so that the MS transmissions remain aligned with the BS with timing allocations within the BS, such as the receive frame, and also that the transmissions are received within the appropriate reception power thresholds. The Periodic Ranging currently employed in an attempt to maintain the appropriate Timing_Offset and Tx power values is generally controlled by way of a Periodic Ranging timer. For example, in WiMAX systems, the Periodic Ranging timer is defined within the MS and, upon expiration of the timer period, is arranged to indicate that the MS has not been given an opportunity to transmit to the BS for a predetermined period of time such that Periodic Ranging should be triggered. The aforementioned predetermined period of time comprises a time period beyond which it is assumed that the previous Timing_Offset and Tx power values for the UL transmission will no longer be valid and must be re-set.

As an example, it is known from the WiMAX Forum, Mobile System Profile Release 1.0 Approved Specification, Revision 1.4.0, 2007-05-02 that the following parameters arise or can be employed:
Frame duration=5 ms
Bandwidth=10 MHz
Sampling rate=28/25
Cyclic Prefix=1/8
Fast Fourier Transform (FFT) size=1024

From the above parameters, and through calculation that the CP duration is in the order of 11.4 μs, the Timing_Offset accuracy, generally set at one quarter of the CP duration, can be considered as in the order of 2.85 μs and this corresponds to a one way propagation distance of 427 m. Then, taking into account potential movement of the MS, for example if moving within a vehicle at maximum motorway speed of 70 mph, the MS may well move beyond the propagation distance within a time of 13.7 s. Thus, to take account of this, the time-out value of the Periodic Ranging timer within the WiMAX MS should not exceed 13.7 s. Indeed, if the WiMAX system is to be employed with an MS moving at an even higher speed such time-out value will of course have to be set at a much smaller value within the Periodic Ranging timer. As clarified below, such an increase in frequency of Periodic Ranging signalling triggered by the timer emphasize the disadvantages that arise through use of this known procedure for maintaining UL synchronisation and Tx power values.

In particular, the use of Periodic Ranging for updating UL Timing_Offset and Tx power values introduces a control signalling overhead, generally in the form of Medium Access Control (MAC) management message exchanges. Further, a subset of Code Division Multiple Access (CDMA) codes will also have to be reserved for the Periodic Ranging signalling and so this removes such codes which could otherwise be used by the purposes within the system, for example within an initial ranging so as to further reduce the probability of signalling-conflict. Such known Periodic Ranging also reduces the effectiveness of power saving features such as "sleep mode" operation since the Periodic Ranging will require the MS to wake from its sleep mode. In particular, CDMA-based Periodic Ranging can also undesirably extend the MS availability Interval in order to await the reception of the Ranging response message, in order to identify the appropriate Ranging opportunity for sending/resending CDMA-based Ranging requests.

As noted above, such disadvantages are particularly emphasized if the Periodic Ranging time-out value is reduced so as to compensate for potential high speed movement of the MS within the network.

Turning now to FIG. 1, there is provided a timing diagram for the transmission and receipt of downlink signalling at a MS and which illustrates, in particular, the potential drift in DL preamble that can arise due to MS mobility. Such drift is advantageously determined, and employed, in accordance with this particular embodiment of the present invention.

As will be appreciated, while MS continues to move, the magnitude of the preamble drift keeps changing. In the illustration of FIG. 1, there is shown the downlink signalling 10 as transmitted at a BS, and the same signalling as received 12 at a MS.

As will be appreciated, each of the signals 10, 12 employs a series of interlaced DL-subframes A, and UL-subframes B wherein each DL-subframe comprises a preamble portion 14 and main body portion 16. As will be appreciated, at time $t_1$ there is a particular value of Timing_Offset which represents the difference between the time of transmission of the preamble 14, and its receipt at the MS. However, due to the mobility of the MS, there is a drift in the Timing_Offset such that, for later subframes, for example at time $t_2$ there has been a change in the delay at which the preamble of the DL-subframe is received at the MS, this difference, i.e. the preamble drift that occurs between the points in time $t_2$ and $t_1$ is identified as $\Delta t_p$.

According to this embodiment of the present invention, the MS is advantageously arranged to monitor the magnitude of the preamble drift $\Delta t_p$ and compare the same with a threshold value. The threshold value corresponds to the maximum variation that the BS and MS can tolerate for correct operation. Should the threshold value be exceeded by a magnitude greater than the threshold value of $\Delta t_p$, then the Timing_Offset will have to be updated within the MS. Likewise, the MS timing reference against the DL preamble can also be updated.

In general operation of a MS such as that receiving the signalling as indicated at 12 in FIG. 1, at the time of entry into a WiMAX network the MS will perform an Initial Ranging procedure to acquire the correct initial Timing_Offset and Tx power adjustment values.

If the WiMAX system is operating within Time Division Duplex (TDD) mode, the advantages of the present invention are particularly enhanced since the UL and DL channels will share the same frequency band and the effects of the multi-path propagation environment between the BS and MS will impact the UL and DL transmissions in the same way at any particular time. That is, since the UL and DL channels use the same frequency band, signal propagation in the UL or DL channel will experience the same multi-path fading and delay spread profiles, and the path-loss patterns will also be the same for both the UL and DL transmissions.

It should be appreciated that the UL Timing_Offset of the MS can be determined on the basis of the distance of the MS from the BS, and is generally equal to a round-trip propagation delay in the MS and BS.

It is also noted that an active MS frequently measures the DL preamble for channel estimation and other purposes, and even while the MS is in a "sleep mode", it is also arranged to measure the DL preamble regularly whenever it wakes-up during a listening window.

Through the Initial Ranging procedure, the MS will also have acquired the initial UL Timing_Offset and initial Tx power levels which can be subsequently employed as follows.

On the basis of the regular measurement of the DL preamble within the MS, the MS can readily perceive DL preamble timing drift $\Delta t_p$ as illustrated in FIG. 1 and, in particular, detect the magnitude of the DL timing drift $\Delta t_p$ accumulated over the time period $t_2-t_1$.

The new Timing_Offset value for update purposes can then be determined from $$\text{Timing\_Offset}_{new} = \text{Timing\_Offset}_{previous} + 2*\Delta t_p$$

Thus, and as noted above, when the magnitude of $\Delta t_p$ exceeds the aforementioned threshold value, a determination of the new Timing_Offset value required can readily be made, and subsequently employed for communication between the MS and BS.

The threshold value against which the magnitude of the preamble drift $\Delta t_p$ can advantageously be broadcast by way of DCD messages. The actual value can be determined at the BS taking into account at least cell size, cyclic prefix length and measurement accuracy.

In addition to the employment of the updated Timing_Offset value that can be readily determined within the MS on the basis of the DL preamble measurements, the invention can also advantageously allow for UL Tx power adjustment updates so as to compensate for path-loss changes.

That is, the MS again has read access to the initial Tx power instruction BS via the Initial Ranging procedure discussed above and the updated Tx power value can readily be determined on the basis of a function of the updated Timing_Offset value determined as described above. Thus, it is required that the Timing_Offset value to be updated, the Tx power value can likewise be updated and as based on a particular propagation loss formula which can readily embodied as a function of the updated Timing_Offset value such as:

$$Tx\_power_{new}(dB) = f_x(\text{Timing\_Offset}_{new})$$

If widely used COST 231-Hata Propagation Model is adopted, then Function $f_x$ can be derived as:

$$Tx\_power_{new}(dB) = 46.3 + 33.9*\log(f) - 13.82*\log(Hb) - a*(Hm) + [44.9 - 6.55*\log(Hb)]*\log(\text{Timing\_Offset}_{new}*c/2)$$

Where
$a(Hm) = [1.1*\log(f) - 0.7]*Hm - [1.56*\log(f) - 0.8]$,
Hm=height of the antenna of mobile station
Hb=height of the antenna of base station
f=carrier frequency
c=speed of light The Tx power adjustment is generally provided so as to compensate for changes in power-loss value changes.

Thus, it will be appreciated that the illustrated embodiment of the present invention allows for the advantageously accurate estimation of updated Timing_Offset and Tx power values based on the assumption that the MS can measure and record the DL preamble timing drift in an accurate manner.

Autonomous maintenance of the UL synchronisation and Tx power values can therefore be maintained without requiring the specific periodic signalling arising in the prior art.

Figure 2:
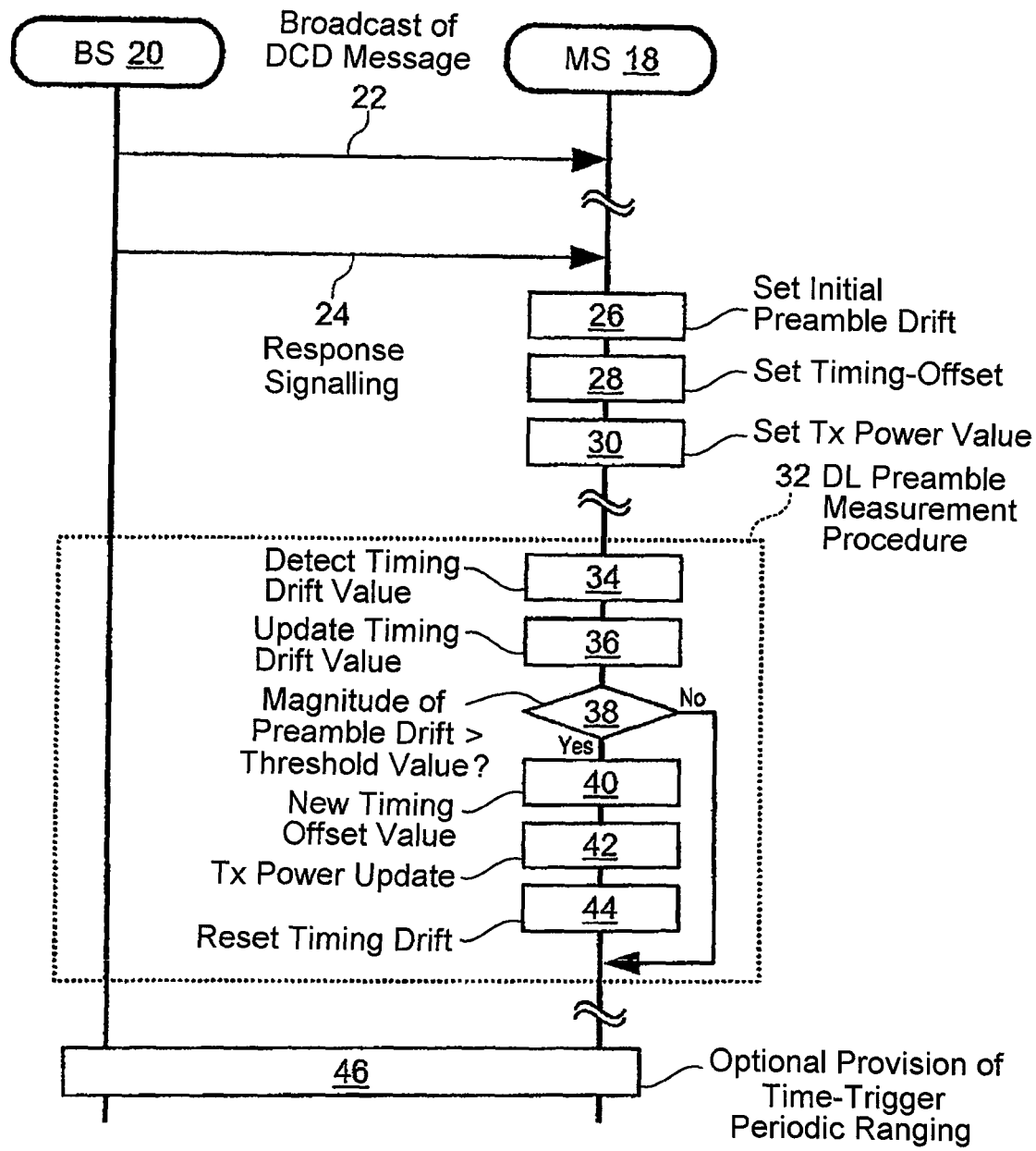
FIG. 2 is a flow-diagram illustrating the operation of the present invention in relation to a mobile station embodying the same.

The invention therefore allows for advantageously simple implementation of a synchronisation and power control scheme and one embodiment is illustrated by way of the timing diagram found in FIG. 2.

Here, the signalling between a MS such as a UE handset 18 of a WiMAX system and a BS 20 of the same system is illustrated and commences with initial broadcast of DCD messages 22 from the BS 20 to the MS 18 and which can contain a preamble drift threshold value against which the magnitude of the measured preamble drift of the receive DL signals is compared.

The initial ranging response signalling 24 is delivered from the BS 20 to the MS 18 and contains the initial Timing_Offset and Tx power values etc. As required, the initial preamble drift, Timing_Offset, and Tx power values are set at 26, 28 and 30 respectively and prior to repeated performance of DL preamble measurement procedures 32.

Thus, within the repeated procedure 32, the DL preamble from the BS 20 is measured so as to detect the timing drift value at 34 and, at 36, the timing drift value is updated as required. However, at 38 it is determined whether or not the magnitude of the preamble drift is greater than the threshold value contained in said DCD message 22. If the threshold is not exceeded, then the repeated procedure 32 continues to its initial conclusion.

If, however the magnitude of the preamble drift exceeds the threshold value, then a new Timing_Offset value is determined at 40 on the basis of the sum of the previous offset value and twice the magnitude of the timing drift $\Delta t_p$.

Likewise, and as discussed above, the primary updating of the Timing_Offset value 40 can be achieved along with a Tx power update at 42 and the timing drift itself can be reset such as at step 44.

As noted, the procedure 32 is then repeated at each measurement of the DL preamble and so, again, allows for control of the UL synchronisation and Tx power values without requiring initiation of signalling from the MS 18.

While the proposed technique of the present invention can advantageously autonomously maintain the Timing_Offset value that is usable for the whole period for the active connection between the MS and BS it will of course be possible, as an option, to also provide for provision of a T4 timer so as to allow for periodic ranging but in accordance with a far greater time out value, for example, in the order of a few minutes, rather than a few seconds, as employed in the current art.

Thus, with reference to FIG. 2, an optional provision of time-trigger periodic ranging 46 can be provided if required.

As will therefore be appreciated, the present invention advantageously remove the need, or greatly reduces, the reliance on periodic ranging and thereby removes or drastically reduces the related signalling overhead. Also, periodic ranging CDMA codes can now be released for other purposes and which can be employed to enhance the general system performance and that can lead to simplification of the implementation of the MS and its related BS.

Also, the effectiveness of other operational characteristics, such as power saving "sleep mode" can be improved.

As will therefore be appreciated, the invention presents a new technique for the MS to autonomously maintain UL synchronisation and transmission power adjustment after it obtains initial UL Timing_Offset and transmission power level from the BS via Initial Ranging procedure. The proposed technique is based on the fact that signal propagation in the UL and DL channels experiences the same multi-path fading and delay spread profile when the system operates in TDD mode, where the UL and DL share the same frequency band. The MS then makes use of its regular DL preamble measurements and detects DL timing drift accumulated over time, which is equal to half of the UL Timing_Offset variation. TDD mode ensures that the MS autonomous calculations on UL Timing_Offset and transmission power adjustment are appropriately accurate so that the MS can maintain UL synchronisation for a much longer time. Adoption of the technique can remove the necessity of Periodic Ranging defined in IEEE 802.16 standard for maintaining the active MS UL synchronisation, and thereby remove the related signalling overhead, reduce radio resources usage and improve power saving performance in Sleep Mode.

Figure 3:
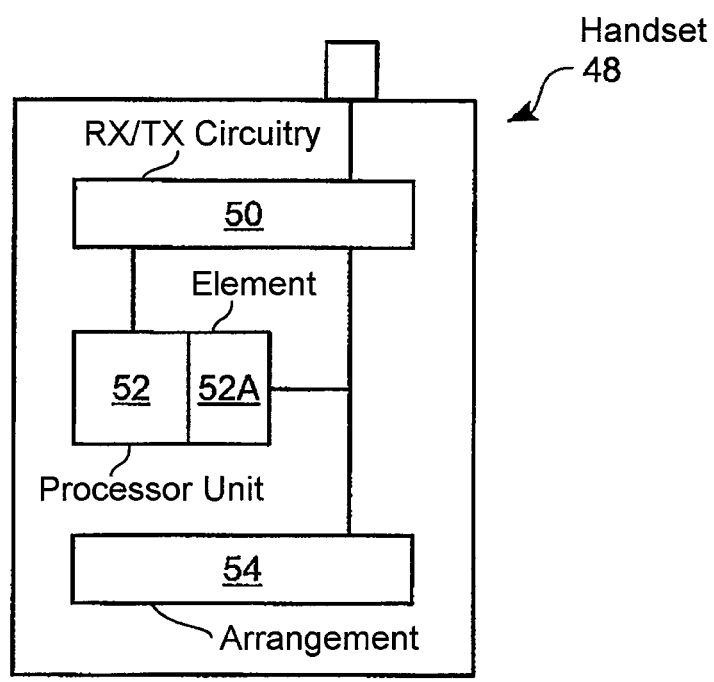
FIG. 3 is a schematic diagram of a mobile station comprising a UE handset arranged according to one embodiment of the present invention.

Turning now to FIG. 3, there is provided a simplified schematic diagram of a MS comprising UE handset 48 arranged to embody the present invention.

Thus, as will be appreciated, the handset 48 contains standard signal reception/transmission circuitry 50, processor unit 52 and an arrangement 54.

The processor unit 52 includes an element 52A, arranged for determination of the preamble drift of the receiver DL signalling, and the comparison of the same with a threshold value and along with functionality for determining an updated Timing_Offset and/or Tx power values as required in accordance with the present invention.

The present invention advantageously provides a departure from the known art in so far as the DL preamble signal can be employed to measure the DL timing drift accumulated over a period of time and during which no UL transmissions take place.

The MS can then autonomously calculate the UL Timing_Offset variation caused by its own mobility within the network, and so arrive at an appropriate Timing_Offset update as required.

Although the technique is proposed for WiMAX TDD mode, this is not a limiting feature of the invention since it can be employed in other modes such as, for example, WiMAX FDD mode where UL and Dl channels use different frequency bands. Since frequency bands are well separated in UL and DL directions, signal propagation in UL and DL channels may have slightly different fading delay spread profiles, thus the autonomous calculation of Timing_Offset might not be as accurate as in WiMAX TDD mode, but nevertheless still readily employable within the invention.

The proposed technique can also be applied to other OFDMA based systems, particularly 3GPP LTE. As will be appreciated LTE is designed to support high mobility (up to 350 km/h) and the CP duration is shorter than in WiMAX and so this can result in a more demanding accuracy requirement for the autonomous calculation of Timing_Offset, and Tx power.

The invention claimed is:

1. A method of controlling uplink (UL) synchronisation in a mobile station of a radio communications network, and including the steps of monitoring timing drift within downlink (DL) signalling and updating an uplink synchronisation value to obtain an update uplink synchronization value, in response to the said timing drift exceeding a threshold value; wherein the update uplink synchronisation value is determined on the basis of the sum of a previous synchronisation value and twice the aforementioned magnitude of the said timing drift in the DL signalling.

2. A method as claimed in claim 1, wherein the threshold value is transmitted by way of Downlink Channel Descriptor (DCD) signalling.

3. A method as claimed in claim 2, wherein the threshold value is determined at a base station within the radio communications network and responsive to at least cell size, cyclic prefix length and measurement accuracy.

4. A method of determining an update synchronization value for uplink synchronisation in a mobile radio communications network and having regard to a current synchronisation value, including the step of determining timing drift within downlink signalling and wherein the update synchronisation value comprises the sum of the said current synchronisation value and twice the magnitude of the said timing drift.

5. A method as claimed in claim 1, wherein the timing drift is determined on the basis of DL preamble measurements.

6. A method of controlling a Tx power value in a mobile station in a radio communications network, including the step of monitoring timing drift within downlink (DL) signalling, updating an uplink synchronization value, and determining the updated uplink synchronisation value on the basis of the sum of a previous synchronization value and twice the magnitude of timing drift in the signalling and wherein the updated Tx power value comprises a function of the said update uplink synchronisation value.

7. A method as claimed in claim 6, wherein the Tx update value is determined whenever the uplink synchronisation value is updated.

8. A method as claimed in claim 1 and provided within a WiMAX system.

9. A method as claimed in claim 1, where the network signalling arises in Time Division Duplex mode.

10. A mobile radio communications device for use within a mobile radio communications network and arranged for controlling uplink synchronisation values, and including:
- a section which monitors a downlink timing drift value;
- a section which updates the uplink synchronisation value to obtain an update uplink synchronization value, in response to the magnitude of the downlink timing drift value exceeding a threshold value; and
- a section which determines the update uplink synchronisation value on the basis of the sum of a previous uplink synchronization value and twice the said magnitude of the downlink timing drift.

11. A mobile radio communications device for use in a mobile radio communications network and arranged for determining an update synchronization value for uplink synchronisation and including means for determining the magnitude of downlink timing drift and wherein the update synchronisation value is determined on the basis of the sum of a previous synchronisation value for the uplink synchronization and twice the magnitude of the said timing drift.

12. A device as claimed in claim 10, and including means for determining an updated Tx power value as a function of the update uplink synchronisation value.

13. A device as claimed in claim 12 and arranged for updating the Tx power value when the uplink synchronisation value updates.

14. A device as claimed in claim 10, and arranged such that the timing drift is determined on the basis of downlink preamble measurements.

15. A method as claimed in claim 4, wherein the timing drift is determined on the basis of DL preamble measurements.

16. A method of controlling a Tx power value in a mobile station in a radio communications network, including the step of determining timing drift within downlink signalling and determining an update uplink synchronisation value on the basis of the sum of a current synchronization value and twice the magnitude of the said timing drift, and wherein the updated Tx power value comprises a function of the said update uplink synchronisation value.

17. A method as claimed in claim 16, wherein the Tx update value is determined whenever the uplink synchronisation value is updated.

18. A method as claimed in claim 4 and provided within a WiMAX system.

19. A method as claimed in claim 4, where the network signalling arises in Time Division Duplex mode.

* * * * *